US008509837B1

(12) United States Patent
Zang et al.

(10) Patent No.: US 8,509,837 B1
(45) Date of Patent: Aug. 13, 2013

(54) TCP-AWARE POWER CONTROL IN WIRELESS NETWORKS

(75) Inventors: Hui Zang, Cupertino, CA (US); Ashwin Sridharan, Sunnyvale, CA (US); Majid Ghaderi, Calgary (CA)

(73) Assignee: Sprint Communications Company L.P., Overland Park, KS (US)

( * ) Notice: Subject to any disclaimer, the term of this patent is extended or adjusted under 35 U.S.C. 154(b) by 460 days.

(21) Appl. No.: 12/706,847

(22) Filed: Feb. 17, 2010

(51) Int. Cl.
*H04B 7/00* (2006.01)

(52) U.S. Cl.
USPC .... 455/522; 455/127.1; 455/13.4; 455/67.11; 370/318

(58) Field of Classification Search
USPC .............. 455/67.11, 522, 13.4, 69, 127.1; 370/318, 320, 328, 335
See application file for complete search history.

(56) References Cited

U.S. PATENT DOCUMENTS

| | | | |
|---|---|---|---|
| 6,374,117 B1* | 4/2002 | Denkert et al. | 455/522 |
| 7,215,653 B2* | 5/2007 | Kim et al. | 370/329 |
| 7,567,529 B1* | 7/2009 | Yarkosky | 370/328 |
| 7,720,499 B2* | 5/2010 | Srikrishna et al. | 455/522 |
| 7,724,699 B2* | 5/2010 | Baey et al. | 370/328 |
| 7,903,572 B2* | 3/2011 | Kwon et al. | 370/252 |
| 2004/0018849 A1* | 1/2004 | Schiff | 455/522 |
| 2005/0201373 A1* | 9/2005 | Shimazu et al. | 370/389 |

OTHER PUBLICATIONS

J. P. Singh, Y. Li, N. Bambos, A. Bahai, B. Xu, and G. Zimmerman, "TCP performance dynamics and link-layer adaptation based optimization methods for wireless networks." In IEEE Transactions on Wireless Communications, May 2007. pp. 1864-1879, vol. 6, Issue No. 5, IEEE Computer Society, Washington, DC, USA.

D. Barman, I. Matta, E. Altman, and R. E. Azouzi, "TCP optimization through FEC, ARQ and transmission power trade offs." In Proc. Wired / Wireless Internet Communications, Feb. 2004. pp. 87-98, Springer, New York, NY USA.

M. Ghaderi, A. Sridharan, H. Zang, D. Towsley, and R. Cruz, "TCP-Aware Resource Allocation in CDMA Networks." In Proc. International Conference on Mobile Computing and Networks, Sep. 2006. pp. 215-226, ACM, New York, NY USA.

H. Zang, M. Ghaderi, A. Sridharan, "TCP-Aware Power Control in Wireless Networks." In Proc. International Conference on Network Protocols, Oct. 2009. pp. 334-343, IEEE Computer Society, Washington, DC, USA.

Pre-Interview First Action Interview in U.S. Appl. No. 12/869,347 mailed Nov. 8, 2012, 6 pages.

* cited by examiner

*Primary Examiner* — Sujatha Sharma (57) ABSTRACT

A method, system, and medium are provided for controlling power usage in a wireless telecommunications network, the method comprising transmitting a pilot signal to a mobile station over a wireless channel, receiving a response that includes a signal-to-interference-and-noise associated with said pilot signal, determining an instantaneous channel rate to be used for a subsequent data transmission to said mobile station based at least on said signal-to-interference-and-noise, selecting a transmit power level for said data transmission; and transmitting data to said mobile station at said channel rate and said power level.

12 Claims, 6 Drawing Sheets

TCP-AWARE POWER CONTROL IN WIRELESS NETWORKS

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

At a high level, ways of controlling power usage in a wireless telecommunications network are provided. In one aspect, a wireless telecommunications base transceiver station performs a method of controlling power usage in a wireless telecommunications network. In one embodiment of this method, the transmit power for the base transceiver station is minimized consistent with maintaining acceptable forward error rates.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| BTS | Base Transceiver Station |
| CDMA | Code Division Multiple Access |
| EVDO | EVolution-Data Optimized |
| FER | Frame Error Rate |
| GSM | Global System for Mobile (Groupe Spécial Mobile) |
| HSDPA | High-Speed Downlink Packet Access |
| IP | Internet Protocol |
| LTE | Long-Term Evolution |
| SINR | Signal-to-Interference-and-Noise Ratio |
| TCP | Transmission Control Protocol |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
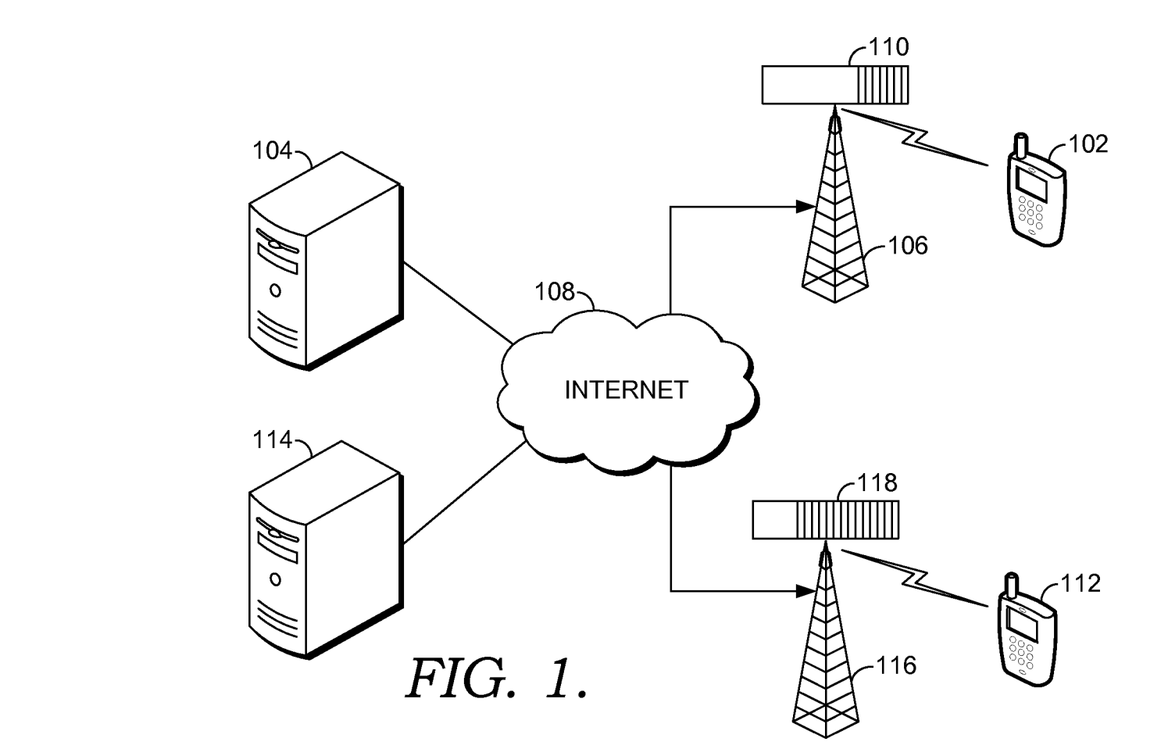
FIG. 1 depicts a block diagram of an exemplary system in accordance with one embodiment of the present invention.

Turning now to FIG. 1, a block diagram of an exemplary system in accordance with one embodiment of the present invention is presented. A first mobile device 102 communicates with a content provider 104 via a BTS 106 and the Internet 108. In one embodiment, mobile device 102 takes the form of a smartphone; in another embodiment, it takes the form of a laptop computer. Other embodiments are possible without departing from the scope of the claims below. Content provided by content provider 104 can take the form of web pages, email services, and other IP data services. BTS 106 communicates wirelessly with mobile device 102, and maintains a queue 110 of data to transmit wirelessly to mobile device 102. In one embodiment, data in queue 120 may take the form of IP packets containing TCP packets, UDP packets, or other transport-layer protocols. In another embodiment, another network-layer protocol is used; in a third embodiment, no network layer protocol is used, and the transport layer is sent directly. In one embodiment, mobile device 102 and BTS 110 communicate via CDMA; other embodiments include EVDO, GSM, HSPDA, LTE, WiFi, and WiMax. This list is intended to be illustrative rather than exhaustive and other wireless protocols are possible without departing from the scope of the claims below.

Similarly, a second mobile device 112 communicates with a second content provider 114 via BTS 116 and Internet 108, and BTS 116 maintains a queue 118 of data to transmit wirelessly to mobile device 112. Mobile device 112 may take the same form as mobile device 102, or a different form; similarly, the type of data sent, the network, transport, and wireless protocols may be the same as those used by mobile device 102 or different.

The maximum rate of data communication between mobile device 102 and BTS 106 is dependent on the signal-to-interference-and-noise ratio (SINR) of the wireless channel in use, as is the maximum rate of data communication between mobile device 112 and BTS 116. Thus, BTS 106 could increase the data rate of its communication with mobile device 102 by transmitting at increased power, thus increasing the "signal" portion of the SINR. However, increasing transmit power in the channel between mobile device 102 and BTS 106 also increases the "interference" portion of the SINR of the channel between mobile device 112 and BTS 116. Thus the optimal data rates for the entire network occur when each BTS transmits at the minimum power necessary to achieve the necessary SINR for a given data rate. However, this power is dependent on the power of all other BTSs transmitting within interference range as well as noise from outside the system and thus cannot be determined accurately in advance. Therefore, some data packets are lost regardless of the transmit power level used; present systems attempt to minimize this loss by choosing a single, fixed transmit power level for each communication with a given mobile device, targeted at an acceptably small FER for a given data rate.

Figure 2:
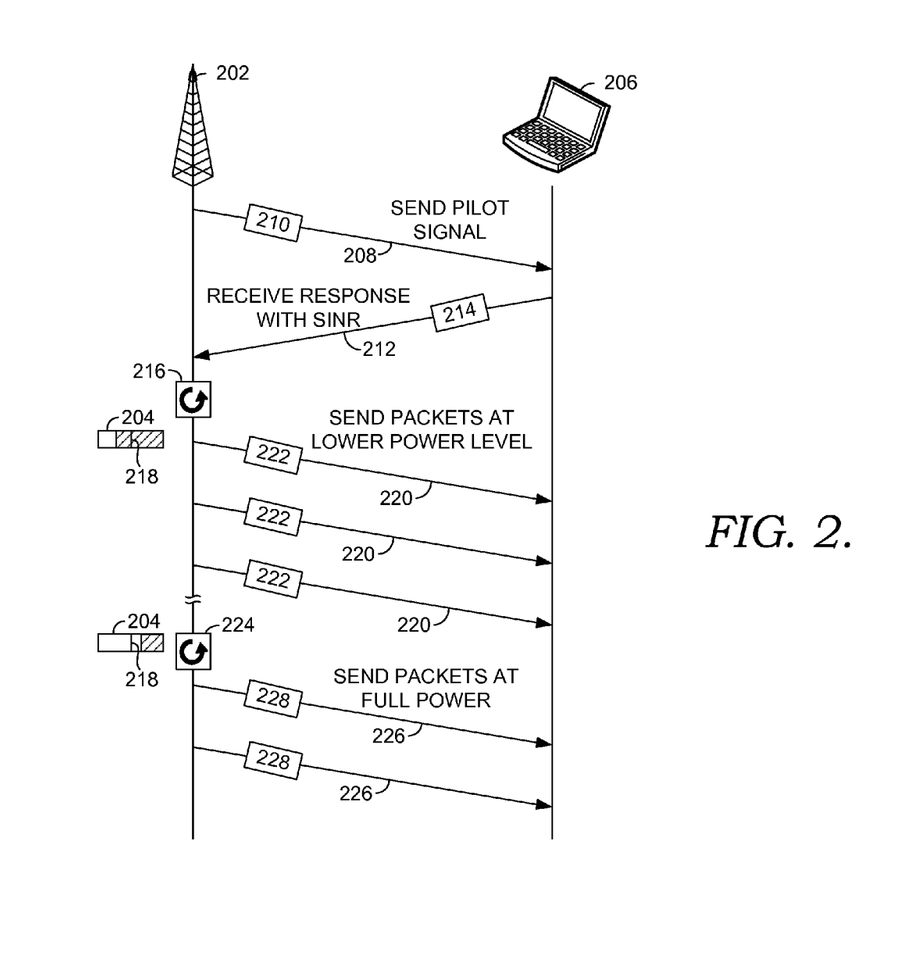
FIG. 2 depicts an illustrative data flow diagram that shows data flowing in accordance with one embodiment of the present invention.

Turning now to FIG. 2, a data flow diagram showing data flowing in accordance with the present invention. BTS 202 has a queue 204 of data to transmit to mobile device 206. BTS 202 corresponds to BTS 106, queue 204 corresponds to queue 110, and mobile device 206 corresponds to mobile device 102. At step 208, BTS 202 transmits a pilot signal 210 to mobile device 206. In one embodiment, pilot signal 210 is transmitted at full power. At step 212, mobile device 206, having received pilot signal 210, transmits a reply 214 to BTS 202 that includes the SINR associated with its reception of pilot signal 210.

At step 216, BTS 202, having received reply 214, determines the data rate for subsequent transmissions. In one embodiment, this data rate is chosen to be the highest data rate the reported SINR will support. A plurality of transmit power levels are then determined, and one is selected. In one embodiment, this plurality is two distinct power levels; in another embodiment, the plurality is three distinct power levels. Other numbers of power levels are possible without departing from the scope of the claims below. Each of these distinct power levels is associated with a queue length threshold 218. In one embodiment, higher power levels are associated with shorter lengths of queue 204; the lowest power level associated with a threshold below the current length of queue 204 is then selected.

At step 220, one or more packets 222 are transmitted at the selected power level. This step continues until the length of queue 204 crosses a threshold such as threshold 218. At step 224, BTS 202 determines that the length of queue 204 has dropped below threshold 218 and chooses a new power level. In one embodiment, the lowest power level associated with a threshold below the new length of queue 204 is selected. At step 226, one or more packets 228 are transmitted at this new power level. In one embodiment, this process of sending packets, and adjusting the transmit power level whenever the current queue length crosses a threshold such as threshold 218 is repeated until no more data remains to be sent from BTS 202 to mobile device 206.

Figure 3:
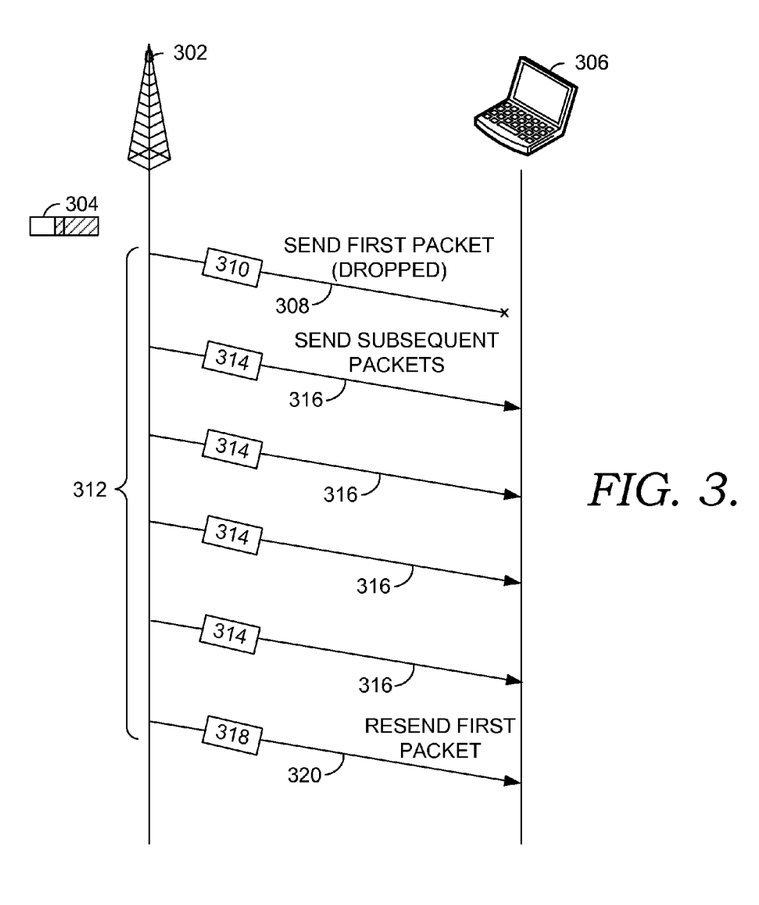
FIG. 3 depicts an illustrative data flow diagram showing the effects of a wireless packet drop in the case that the BTS has a full transmit queue.

Turning now to FIG. 3, an illustrative data flow diagram showing the effects of a wireless packet being lost in the course of transmission from a BTS 302 with transmit queue 304 to a mobile device 306 in the case that transmit queue 304 is long is presented. BTS 302 corresponds to BTS 202, transmit queue 304 corresponds to transmit queue 202, and mobile device 306 corresponds to mobile device 206. The transmission process initially proceeds as in FIG. 2.

At step 308, however, BTS 302 transmits a packet 310, which is not correctly received by mobile device 306. This loss is not detected until an interval 312 has elapsed; however, since queue 304 is long, one or more packets 314 making up the remainder of the data to be transmitted can be sent at step 316 before the loss of packet 310 has been detected. After interval 312 has elapsed, the loss of packet 310 is detected and a retransmission 318 of packet 310 occurs at step 320. During this time, the queue is non-empty and hence the BTS is able to continuously transmit packets, thereby maintaining application throughput at a high level.

Figure 4:
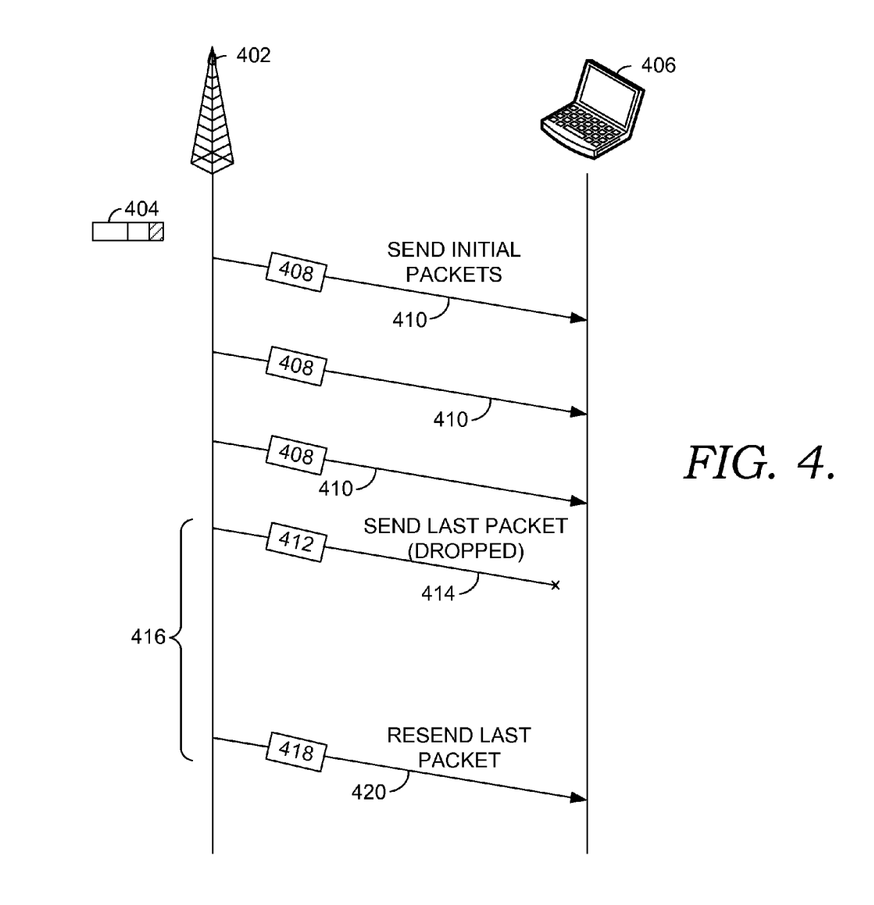
FIG. 4 depicts an illustrative data flow diagram showing the effects of a wireless packet drop in the case that the BTS has an empty transmit queue.

Turning now to FIG. 4, an illustrative data flow diagram showing the effects of a wireless packet being lost in the course of transmission from a BTS 402 with transmit queue 404 to a mobile device 406 in the case that transmit queue 404 is empty is presented. BTS 402 corresponds to BTS 202, transmit queue 404 corresponds to transmit queue 204, and mobile device 406 corresponds to mobile device 206. As before, the transmission initially proceeds as in FIG. 2.

In this case, however, instead of the first packet of the transmission (i.e., packet 310) being lost, the initial packets 408 of the transmission are sent successfully at step 410, and packet 412 is unsuccessfully transmitted at step 414. As in FIG. 3, this loss is not detected for an interval 416; however, unlike the case of FIG. 3, transmit queue 404 is now empty, so no packets can be sent until interval 416 has elapsed and a retransmission 418 of lost packet 412 occurs at step 420. Hence during the interval 416, the queue is empty, so no packets can be transmitted, and application throughput is significantly lowered. Compare this to FIG. 3, where a packet drop with a long queue of packets to transmit did not adversely affect application throughput.

Figure 5:
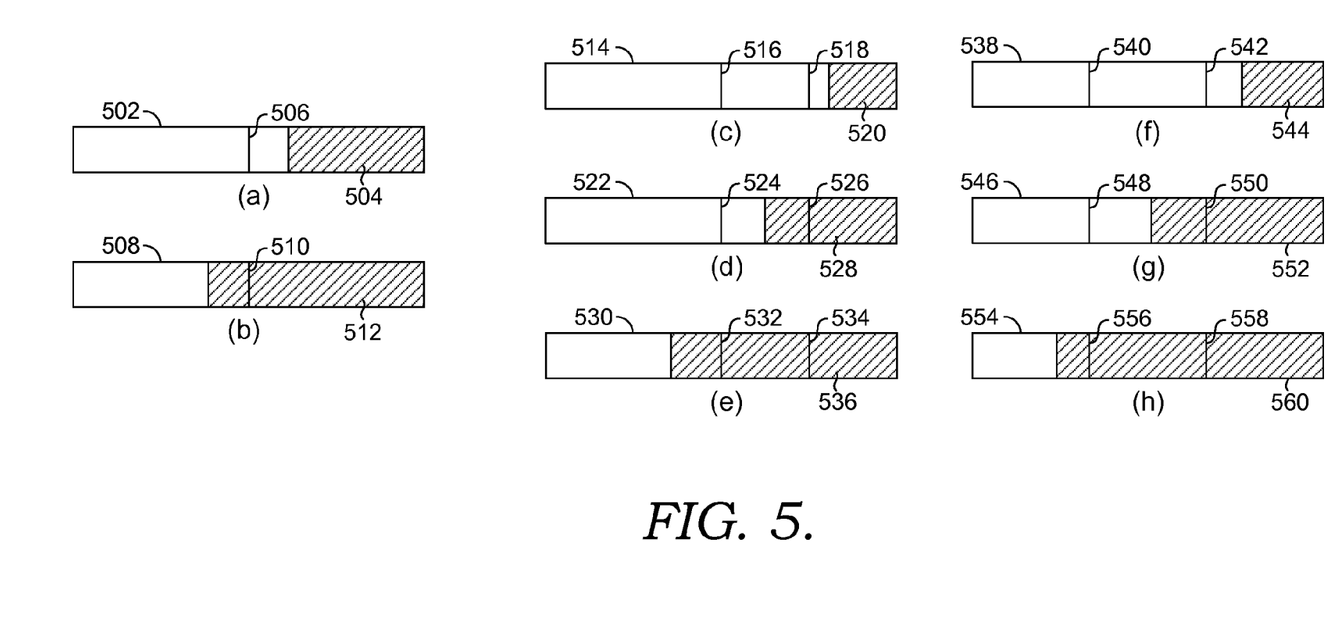
FIGS. 5A-5H depict transmit queues with various amounts of data in them and various transmit power level thresholds.

From FIGS. 3 and 4, we can see that packet loss is considerably more costly when the transmit queue is short than when it is long. Accordingly, more effort should be expended to ensure that packets arrive in the former case than in the latter case. In a wireless telecommunications environment, this translates to increasing transmission power. FIG. 5 depicts a series of strategies for setting a threshold queue length and corresponding transmission power. FIG. 5A shows a transmit queue 502 containing some quantity of data 504. In this embodiment, the threshold 506 is set at one-half of the maximum queue length. Since the amount of data in the queue 504 is less than the threshold 506, a higher power level is used. In one embodiment, this higher power level is maximum power.

FIG. 5B depicts a transmit queue 508, corresponding to queue 502, with threshold 510, corresponding to threshold 506. In this case, however, the amount of data in the queue 512 is greater than threshold 510, and a lower power level can be used. In one embodiment, this lower power level is the lowest power level possible such that the expected SINR will result in a FER that does not exceed a specified maximum FER.

FIG. 5C shows a transmit queue 514 with a higher threshold 516 and a lower threshold 518, and with an amount of data 520. In this embodiment, higher threshold 516 is set at one-half of the maximum length of queue 514, and lower threshold 518 is set at, for example, one-quarter of the maximum length of queue 514. In this case, the amount of data 520 is below the lower threshold, so a higher power level is used. In one embodiment, this power level is maximum power.

FIG. 5D shows a transmit queue 522, corresponding to transmit queue 514, with higher threshold 524 and lower threshold 526 corresponding to higher and lower thresholds 516 and 518 respectively. In this case, however, the amount of data 528 in queue 522 is above lower threshold 526 but below higher threshold 524. Accordingly, an intermediate transmission power level is used.

FIG. 5E shows a transmit queue 530, corresponding to transmit queue 514, with higher threshold 532 and lower threshold 534 corresponding to higher and lower thresholds 516 and 518 respectively. In this case, the amount of data 536 in the queue is above higher threshold 532, so a lower power level can be used. In one embodiment, this lower power level is the lowest power level possible such that the expected SINR will result in a FER that does not exceed a specified maximum FER.

FIG. 5F shows a transmit queue 538 with a higher threshold 540 and a lower threshold 542, and with an amount of data 544. In this embodiment, higher threshold 540 is set at two-thirds of the maximum length of queue 538, and lower threshold 542 is set at one-third of the maximum length of queue 538. Contrast this policy for setting thresholds with that of FIGS. 5C-5E. In this case, the amount of data 544 is below the lower threshold, so a higher power level is used. In one embodiment, this power level is maximum power.

FIG. 5G shows a transmit queue 546, corresponding to transmit queue 538, with higher threshold 548 and lower threshold 550 corresponding to higher and lower thresholds 540 and 542 respectively. In this case, however, the amount of data 552 in queue 546 is above lower threshold 550 but below higher threshold 548. Accordingly, an intermediate transmission power level is used.

FIG. 5H shows a transmit queue 554, corresponding to transmit queue 538, with higher threshold 556 and lower threshold 558 corresponding to higher and lower thresholds 540 and 542 respectively. In this case, the amount of data 560 in the queue is above higher threshold 556, so a lower power level can be used. In one embodiment, this lower power level is the lowest power level possible such that the expected SINR will result in a FER that does not exceed a specified maximum FER.

Figure 6:
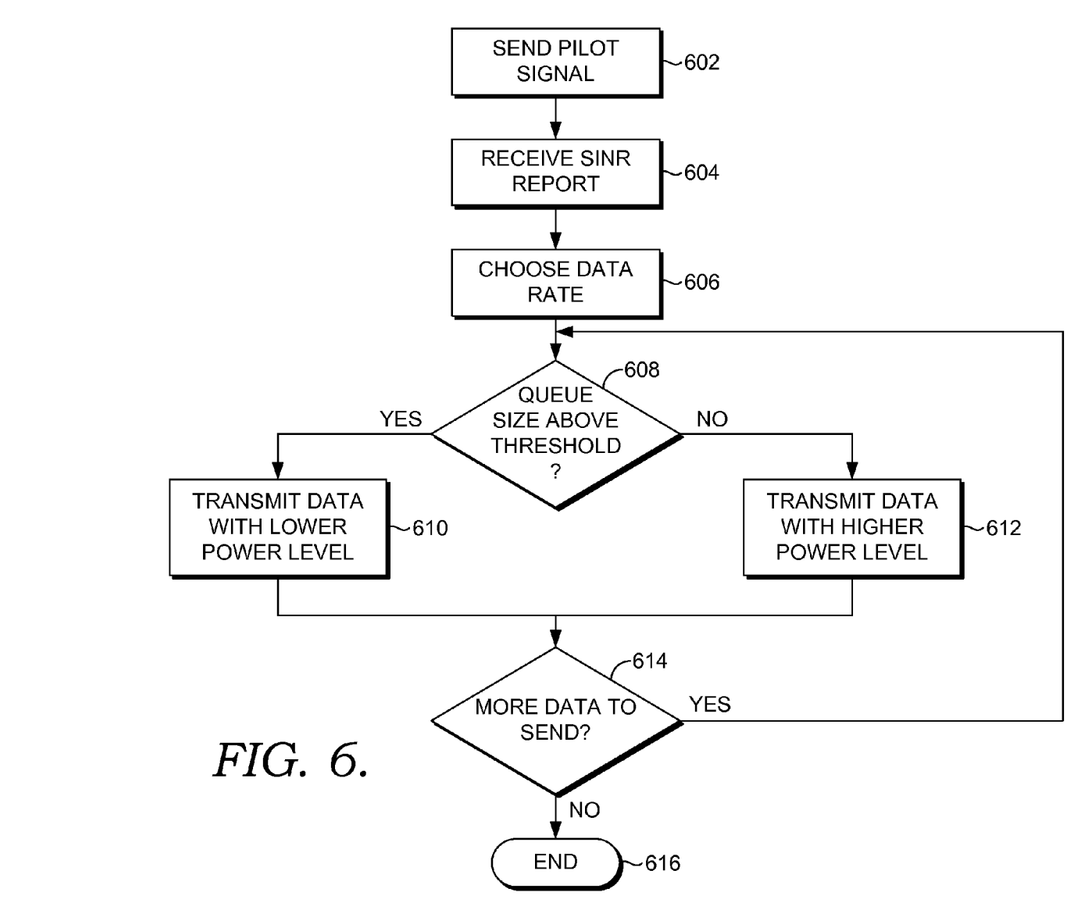
FIG. 6 depicts a flow diagram of an exemplary method in accordance with one embodiment of the present invention.

Turning now to FIG. 6, a flow diagram of an exemplary method in accordance with one embodiment of the present invention is presented. In one embodiment, this method is performed by a BTS such as BTS 106. At step 602, a pilot signal is transmitted. In one embodiment, this pilot signal is transmitted at full power. In another embodiment, this pilot signal is broadcast to all mobile devices within transmission range.

Each mobile device is programmed to, upon receiving this pilot signal, respond with a reply such as reply 214 containing a report of the SINR associated with receiving the pilot signal. In step 604, this reply is received for a specific mobile device (such as mobile device 102) with one or more associated transmission queues (such as queue 110).

Many wireless standards include multiple possible data rates, with higher data rates requiring higher SINR to be successfully received; thus, for a reported SINR, there is a highest data rate that the reported SINR can support for a target FER. For example, EVDO can support twelve distinct data rates. Upon receiving the SINR report, an appropriate data rate is then selected in step 606. In one embodiment, this data rate is the highest data rate that the reported SINR can support for a target FER.

In step 608, the amount of data (such as data amount 504) in the transmit queue from which data is to be sent (such as transmit queue 502) is determined and compared to a threshold queue length (such as threshold 506). In the embodiment shown, the amount of data in the transmit queue is only compared to a single threshold queue length, but in another embodiment, it may be compared to a plurality of thresholds.

If the amount of data in the transmit queue is above the threshold, a packet of data (such as packet 222) is transmitted with a lower power level in step 610. In one embodiment, this power level may be the lowest power level possible such that the expected SINR will result in a FER that does not exceed the target FER.

Otherwise, if the amount of data in the transmit queue is below the threshold, a packet of data is transmitted with a higher power level in step 612. In one embodiment, this power level is the maximum power level. In another embodiment, this power level is the lowest power level possible such that the expected SINR will result in a FER that does not exceed a FER specified to be lower than the target FER.

In step 614, it is determined whether data remains to be sent. In one embodiment, this is accomplished by examining the amount of data in the transmit queue to see if it is zero. In another embodiment, this may be accomplished by examining the state of the transport-layer connection to determine if it is closed or closing.

If no data remains to be sent, the connection with the mobile device is closed in step 616. Otherwise, in the illustrated embodiment, steps 608 et seq. are repeated. In another embodiment, the process may begin again by sending another pilot signal as in step 602. In yet another embodiment, the mobile device may send an SINR report for the packet sent in step 610 or 612, allowing the method to repeat from step 604.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of controlling power usage in a wireless telecommunications network, the method comprising:

transmitting a pilot signal to a mobile station using a wireless channel;

receiving a response that includes a signal-to-interference-and-noise ratio associated with said pilot signal;

determining an instantaneous channel rate to be used for a subsequent data transmission to said mobile station based at least on said signal-to-interference-and-noise ratio;

selecting a transmit power level for said data transmission, the transmit power level selected based at least on a length of a transmission queue, wherein:

(1) the transmit power level is a higher power level if the transmission queue length is below a predetermined threshold length, wherein the higher power level is selected to be full power, and (2) the transmit power level is a lower power level if the transmission queue length is above the predetermined threshold length, wherein the lower power level is selected to be a lowest power level such that an expected transmission error rate remains below a predetermined maximum transmission error rate; and transmitting data to said mobile station at said channel rate and said transmit power level.

2. The media of claim 1, wherein said wireless channel carries one or more of the following:
- CDMA traffic;
- GSM traffic;
- EVDO traffic;
- HSPDA traffic;
- LTE traffic;
- WiFi traffic; and
- WiMax traffic.

3. The media of claim 1, wherein the queue is a TCP queue.

4. The media of claim 1, wherein said predetermined threshold length is one-half of a maximum length for said queue.

5. The media of claim 1, wherein
- the power level is a higher power level if said queue length is below a first predetermined threshold length;
- the power level is an intermediate power level if said queue length is above said first predetermined threshold length but below a second predetermined threshold length; and
- the power level is a lower power level if said queue length is above said second predetermined threshold.

6. The media of claim 5, wherein
- said higher power level is chosen to be full power;
- said lower power level is chosen to be a lowest power level such that an expected transmission error rate remains below a predetermined maximum transmission error rate; and
- said intermediate power level is chosen to be lower than said higher power level and higher than said lower power level.

7. The media of claim 5, wherein
- said first predetermined threshold length is one-half of a maximum length for said queue; and
- said second predetermined threshold length is one-quarter of a maximum length for said queue.

8. The media of claim 5, wherein
- said first predetermined threshold length is two-thirds of a maximum length for said queue; and
- said second predetermined threshold length is one-third of a maximum length for said queue.

9. Non-transitory computer-readable media having computer-executable instructions embodied thereon that, when executed, facilitate a method of controlling power usage in a wireless telecommunications network, the method comprising:
- selecting a transmit power level for a data transmission to a mobile station based on a length of a transmission queue, wherein:
  - (1) the transmit power level is a higher power level if the transmission queue length is below a predetermined threshold length, wherein the higher power level is selected to be full power, and
  - (2) the transmit power level is a lower power level if said queue length is above the predetermined threshold length, wherein the lower power level is selected to be a lowest power level such than an expected transmission error rate remains below a predetermined maximum transmission error rate; and
- transmitting data from said queue to said mobile station at said power level.

10. The media of claim 9, wherein said queue is a TCP queue.

11. The media of claim 9, wherein said predetermined threshold length is one-half of a maximum length for said queue.

12. A base transceiver station that performs a method of controlling power usage in a wireless telecommunications network, the method comprising:
- transmitting a pilot signal to a mobile station over a wireless channel;
- receiving a response that includes a signal-to-interference-and-noise associated with said pilot signal;
- determining an instantaneous channel rate to be used for a subsequent data transmission to said mobile station based at least on said signal-to-interference-and-noise;
- selecting a transmit power level for said data transmission, the transmit power level selected based on the length of a TCP queue, wherein:
  - (1) the transmit power level is selected to be full power if the TCP queue length is below a predetermined threshold length, the predetermined threshold length comprising one-half of a maximum length for the TCP queue, and
  - (2) the transmit power level is selected to be at a lowest power level such that an expected transmission error rate remains below a predetermined maximum transmission error rate if the TCP queue length is above the predetermined threshold length; and
- transmitting data to said mobile station at said channel rate and said power level.

* * * * *